(12) United States Patent
Rottelberger et al.

(10) Patent No.: US 11,077,882 B2
(45) Date of Patent: Aug. 3, 2021

(54) COVERING OF AN OUTER SILL, ENERGY STORAGE ELEMENT AND VEHICLE

(71) Applicant: Bayerische Motoren Werke Aktiengesellschaft, Munich (DE)

(72) Inventors: Markus Rottelberger, Altdorf (DE); Harald Lathwesen, Mauern (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 148 days.

(21) Appl. No.: 16/591,723

(22) Filed: Oct. 3, 2019

(65) Prior Publication Data
US 2020/0031400 A1 Jan. 30, 2020

Related U.S. Application Data

(63) Continuation-in-part of application No. 15/952,716, filed on Apr. 13, 2018, now abandoned, which is a
(Continued)

(30) Foreign Application Priority Data

Oct. 16, 2015 (DE) .................... 10 2015 220 214.3

(51) Int. Cl.
*B60R 13/04* (2006.01)
*B62D 25/02* (2006.01)
*B60K 1/04* (2019.01)

(52) U.S. Cl.
CPC .............. *B62D 25/025* (2013.01); *B60K 1/04* (2013.01); *B60R 13/04* (2013.01); *B60K 2001/0405* (2013.01)

(58) Field of Classification Search
CPC .............. B60K 1/04; B60K 2001/0405; B62D 25/025; B60R 13/04
See application file for complete search history.

(56) References Cited

U.S. PATENT DOCUMENTS

| 6,276,109 B1 | 8/2001 | Hingorani et al. |
| 2012/0160583 A1 | 6/2012 | Rawlinson |

FOREIGN PATENT DOCUMENTS

| DE | 102 24 884 A1 | 12/2003 |
| DE | 10 2004 049 298 A1 | 4/2006 |
| DE | 10 2012 215 848 A1 | 6/2014 |

OTHER PUBLICATIONS

International Search Report (PCT/ISA/210) issued in PCT Application No. PCT/EP2016/074484 dated Nov. 25, 2016 with English translation (five pages).

(Continued)

*Primary Examiner* — D Glenn Dayoan
*Assistant Examiner* — Melissa Ann Bonifazi
(74) *Attorney, Agent, or Firm* — Crowell & Moring LLP

(57) ABSTRACT

A covering of an outer sill of a vehicle, in particular a motor vehicle, has a covering region and a mounting region, which extend between first and second ends of the covering along a direction of longitudinal extension. The mounting region extends in a first direction of transverse extension perpendicular to the direction of longitudinal extension and has mounting elements in order to be able to be mounted on an underside of the outer sill for a mounted state. The mounting region has a lateral edge facing away from the covering region in the direction of longitudinal extension, which has recesses between mounting elements, which are formed such that sections of the lateral edge of the mounting region extend in a recessed manner in the first direction of transverse extension towards the covering region.

14 Claims, 10 Drawing Sheets

Related U.S. Application Data continuation of application No. PCT/EP2016/074484, filed on Oct. 12, 2016.

(56) References Cited

OTHER PUBLICATIONS

German-language Written Opinion (PCT/ISA/237) issued in PCT Application No. PCT/EP2016/074484 dated Nov. 25, 2016 (six pages).
German-language Search Report issued in German Application No. 10 2015 220 214.3 dated Jun. 14, 2016 with partial English translation (14 pages).
English translation of Chinese-language Office Action issued in counterpart Chinese Application No. 201680057575.4 dated Oct. 8, 2019 (two (2) pages).

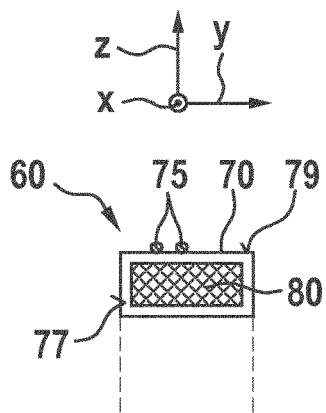
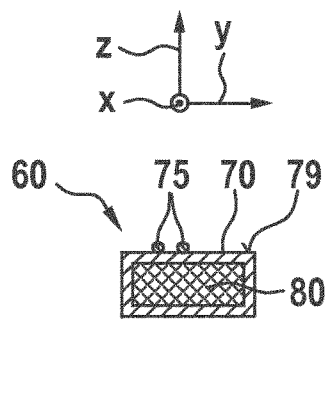
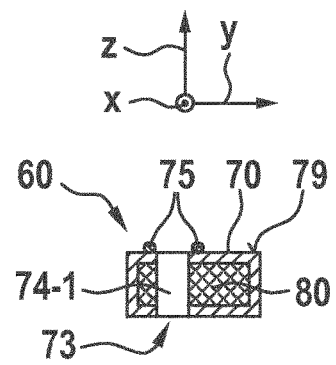
Fig. 12A    Fig. 12B    Fig. 12C
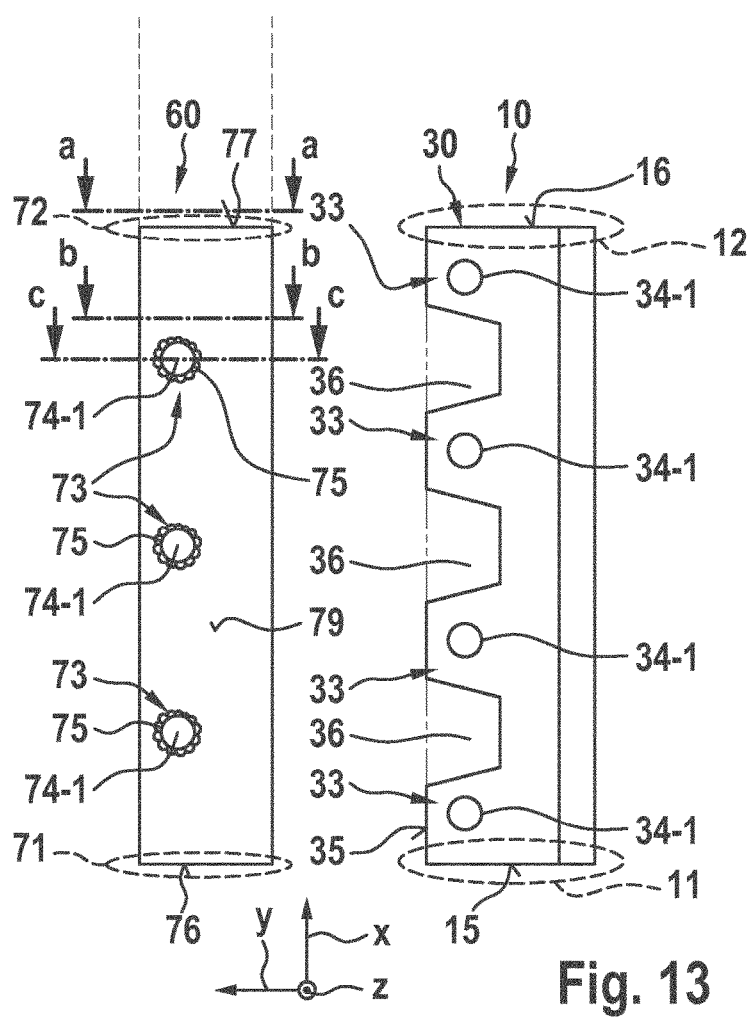
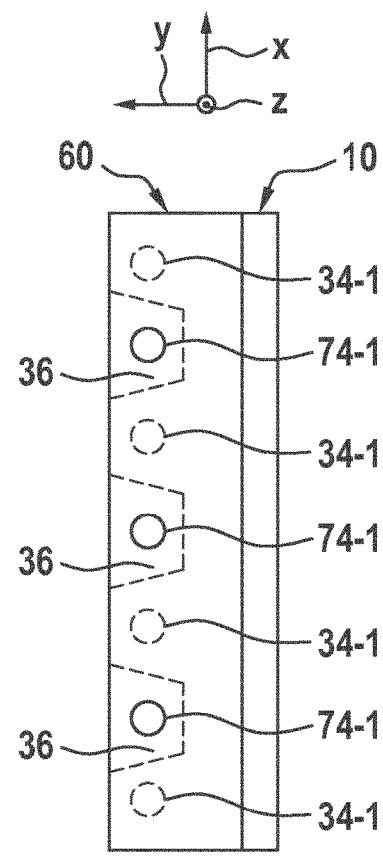
Fig. 13    Fig. 14

COVERING OF AN OUTER SILL, ENERGY STORAGE ELEMENT AND VEHICLE

CROSS REFERENCE TO RELATED APPLICATIONS

This application is a continuation-in-part of application Ser. No. 15/952,716, filed Apr. 13, 2018, which is a continuation of PCT International Application No. PCT/EP2016/074484, filed Oct. 12, 2016, which claims priority under 35 U.S.C. § 119 from German Patent Application No. 10 2015 220 214.3, filed Oct. 16, 2015, the entire disclosures of which are herein expressly incorporated by reference.

BACKGROUND AND SUMMARY OF THE INVENTION

The present invention relates to a covering of an outer sill, to an energy storage element of a vehicle and to a vehicle. The present invention relates in particular to a covering of an outer sill of a vehicle, preferentially of a motor vehicle, to an energy storage element of a vehicle, in particular of an electric or hybrid motor vehicle, and to a vehicle, in particular to a motor vehicle.

Sill systems are known in which the sill as a whole is interconnected from individual parts in the body manufacture for example by welding. Furthermore, sill coverings exist, which in different forms and embodiments are mounted on in the assembly, in particular on the side and underside of the respective sill.

Here it is problematic, in particular, that previous sill coverings do not take into account any units which are likewise mounted to the vehicle underside, for example as part of the so-called high-voltage storage integration in electric or hybrid vehicles. Up to now, units and in particular high-voltage storage elements have accordingly been arranged and mounted on the vehicle underside next to a respective sill covering. If the space directly below the sill is to be also utilized for the high-voltage storage integration, the mounting of the high-voltage storage elements and of the sill covering would not be realizable independently of one another so that in the case of a replacement of the sill covering or of the high-voltage storage element, both components would always have to be dismounted and after the replacement of one of the components, both components would also have to be newly mounted.

The invention is based on the object of providing a covering of an outer sill, an energy storage element of a vehicle and a vehicle, in the case of which the components used and, in particular, the covering and the energy storage element (i) can be employed in a particularly versatile manner, so that for example the same components can be used for different vehicle types and (ii) can be mounted and dismounted easily and independently of one another.

The object on which the invention is based is achieved by a covering of an outer sill, by an energy storage element of a vehicle, and by a vehicle in accordance with embodiments of the invention.

According to a first aspect of the present invention, a covering of an outer sill of a vehicle and, in particular, of a motor vehicle includes a covering region and a mounting region, which extend between first and second ends of the covering along a longitudinal extension direction X. The mounting region extends in a first transverse extension direction Y perpendicularly to the longitudinal extension direction X and comprises one or more mounting elements so as to be mountable for a mounted state on an underside of the outer sill. Facing away from the covering region in the longitudinal extension direction X, the mounting region comprises a lateral edge which, between mounting elements, comprises one or more recesses which are formed so that the lateral edge of the mounting region in the first transverse extension direction Y runs set back towards the covering region in sections. Because of the fact that the lateral edge of the mounting region of the covering of the outer sill between the mounting elements of the mounting region runs set back towards the covering region in sections because of the recesses of the lateral edge, space is created between the mounting elements of the mounting region of the covering which can serve for mounting other units to the underside of the vehicle and, in particular, of the outer sill. By providing a covering with such an undulating lateral edge, the outer sill of the vehicle according to the invention can be covered irrespective of whether in fact further units are mounted on the underside of the outer sill. The recesses also make possible the independence of the mounting of the covering of the outer sill relative to possible but not obligatory further units on the underside of the vehicle.

A particularly large amount of space is given to a mounting of possible additional units, namely with unchanged good fastening possibility of the covering of the outer sill to the underside of the outer sill when, according to a preferred embodiment of the covering according to the invention, the recesses of the lateral edge are formed so that the lateral edge of the mounting region in the first transverse extension direction y runs set back behind the mounting elements in sections.

A particularly high degree of stability is achieved when as many mounting possibilities for additional units as possible are provided. For this reason it is provided according to another embodiment of the covering according to the invention that the lateral edge of the mounting region comprises a recess between every two mounting elements that are directly adjacent following one another. Individual positions for fastening points can also be omitted.

The fastening elements of the sill covering and of the high-voltage storage element can also be arranged in a line.

Covering the outer sill can be effected particularly reliably when, according to a further preferred embodiment of the covering according to the invention, the covering region extends in a second transverse extension direction Z perpendicularly to the longitudinal extension direction X in order to cover, in a mounted state, an outside of the outer sill along the longitudinal extension direction X and the second transverse extension direction z outside and laterally on the vehicle.

The manageability of the covering according to the invention proves to be particularly simple when the covering region and the mounting region are connected to one another in the longitudinal extension direction X, in particular in a unitary material and/or in multi-part or multi-piece manner.

A further simplification of the mounting materializes when, according to another preferred embodiment of the covering according to the invention, a respective mounting element is a mounting hole which is formed for receiving a mounting device. Here, all known mounting devices are conceivable, for example screws, clips and the like.

According to a further aspect of the present invention, an energy storage element of a vehicle and, in particular, of an electric or hybrid motor vehicle is provided. According to the invention, this energy storage element is formed with a housing region and an energy store which is formed in the interior of the housing region. Here, the housing region extends along a longitudinal extension direction X. The housing region comprises at least one fastening element so as to be fastenable, for a mounted state, with a mounting side of the housing region facing an underside of the vehicle and in particular an underside of an outer sill of the vehicle. In that regard, the housing region may extend from the outer sill on one side of the vehicle to the outer sill on the other side of the vehicle with a mounting side facing the underside of both outer sills.

As fastening elements, all measures known in the prior art are possible. However, fastening the energy storage element proves to be particularly simple when the at least one fastening element is formed as a fastening hole in or through the housing region, which extends in a transverse extension direction Z perpendicularly to the longitudinal extension direction X and which is formed for receiving a fastener.

In order to achieve handling of the energy storage element independently of other components to be mounted or dismounted with a view to fastening to or removing from a vehicle underside, it is provided according to another preferred embodiment of the energy storage element according to the invention that on the mounting side of the housing region in the region of the at least one fastening element at least one spacer element is formed, which extends in the transverse extension direction Z and in the mounted state creates a spatial distance between the mounting side of the housing region and the underside of the vehicle.

Particularly preferred for configuring the energy storage element according to the invention is the field of so-called high-voltage storage elements.

According to another aspect of the present invention, a vehicle, in particular a motor vehicle, is provided, with a body which comprises an outer sill and with a covering for the outer sill according to the invention, wherein the covering is fastened to an underside of the outer sill by way of the mounting elements of the mounting region.

Advantageously, the vehicle is designed so that it combines the advantages of the covering according to the invention and of the energy storage element according to the invention in that, namely, the vehicle is designed as electric or hybrid motor vehicle and comprises at least one energy storage element according to the invention. Here, the energy storage element is mounted with the mounting side of the housing region of the energy storage element facing an underside of the vehicle and, in particular, an underside of both outer sills of the vehicle in such a manner that a respective fastening element of the energy storage element is arranged, in particular together with a spacer element, in the region of a recess of the mounting region of the covering of the outer sills.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 12A-C, 13, 14 show partly sectioned views from the front and plan views of an embodiment of an energy storage element according to the invention.

Figure 1:
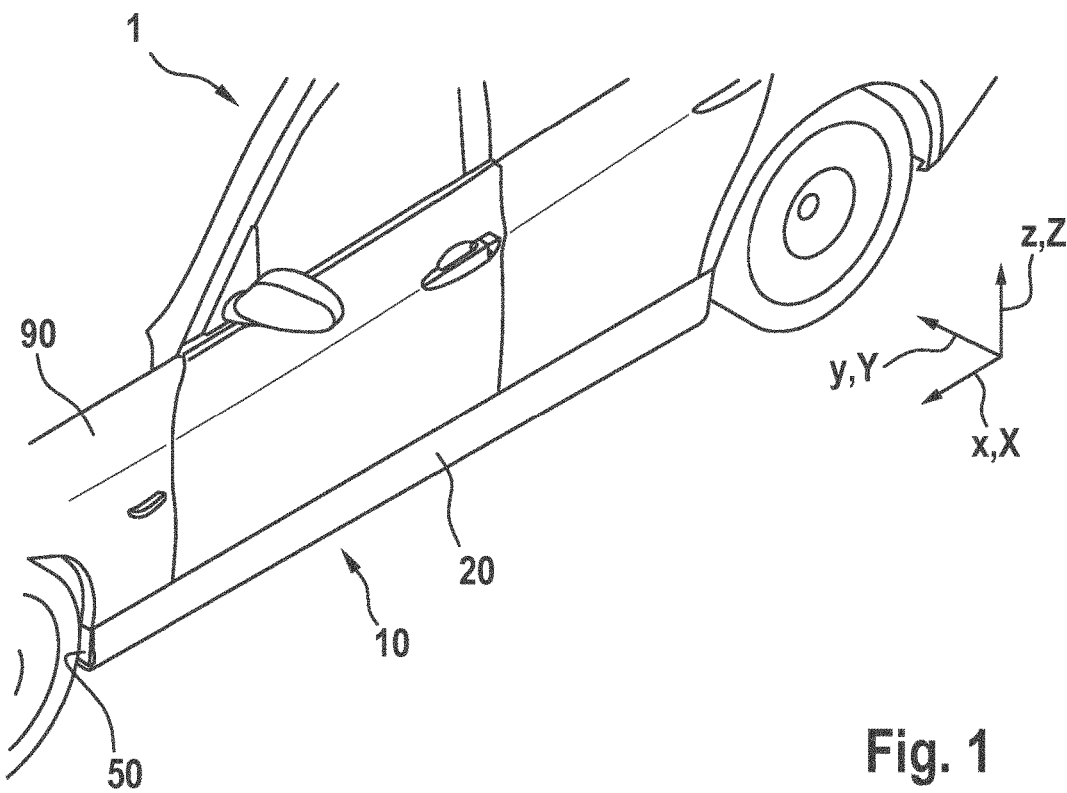
FIG. 1 shows a schematic and perspective lateral view of a vehicle using a covering for an outer sill according to an embodiment of the invention.

The figures show in a schematic manner embodiments of the present invention. Components that are the same or equivalent or have the same or equivalent effect are marked with the same reference characters. A detail description is not repeated every time it occurs. The features and further characteristics of the invention mentioned in the claims, the figures and the description can be separated in any way from one another or combined with one another without departing from the scope of the invention.

DETAILED DESCRIPTION OF THE DRAWINGS

Figure 2:
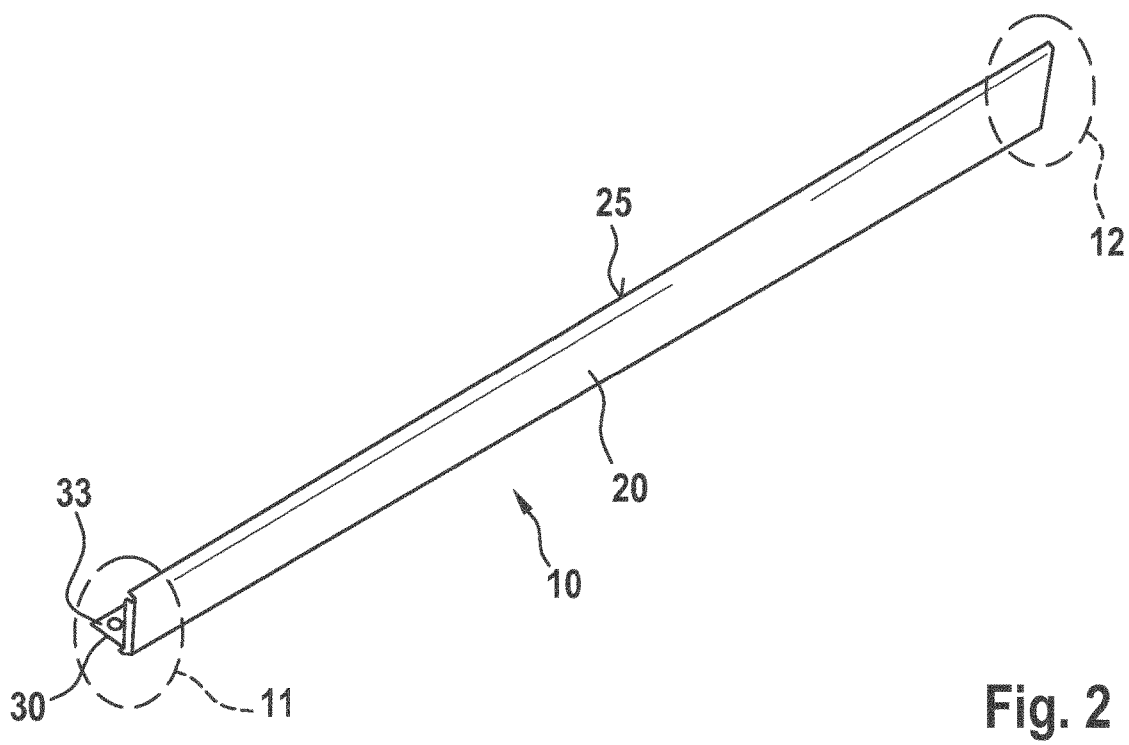
FIG. 2 shows in isolated form and in a perspective lateral view the covering of the embodiment from FIG. 1.

The FIGS. 1 and 2 show in a perspective lateral view an embodiment of a covering 10 of an outer sill 50 of a vehicle 1 according to the invention in the state mounted on the outer sill 50 (FIG. 1) or in isolated form (FIG. 2).

The covering 10 is extended along a longitudinal extension direction X which is identical with the x-direction and corresponds to the vehicle longitudinal axis. The covering 10 has a first or front end 11 and a second or rear end 12 located opposite the former. In cross section, i.e. in a section parallel to the yz-plane, the covering 10 approximately has the shape of a horizontally mirrored L with a covering region 20, which extends approximately parallel to the xz-plane, and with a mounting region 30, which extends approximately parallel to the xy-plane. The covering region 20 and the mounting region 30 thus extend or run between the first and second ends 11 or 12 of the covering 10 along the longitudinal extension direction X. In addition, the mounting region 30 extends in the y-direction as first transverse extension direction Y perpendicularly to the longitudinal extension direction X.

The covering region 20 extends in a second transverse extension direction Z, which with the z-direction runs perpendicularly to the longitudinal extension direction X.

In the mounted state shown in FIG. 1, the covering region 20 of the covering 10 covers an outside of the outer sill 50 along the longitudinal extension direction X and in the second transverse extension direction Z outside and laterally on the vehicle 1.

The outer sill 50 of the vehicle 1 can be considered as part of the body 90 of the vehicle 1 where it is formed laterally on the outside. For mounting the covering 10 laterally on the outer sill 50, the mounting region 30 of the covering 10 is formed with a plurality of mounting elements 33.

The details of a dismounted and of a mounted state are explained in connection with FIGS. 3 to 5.

Figure 3:
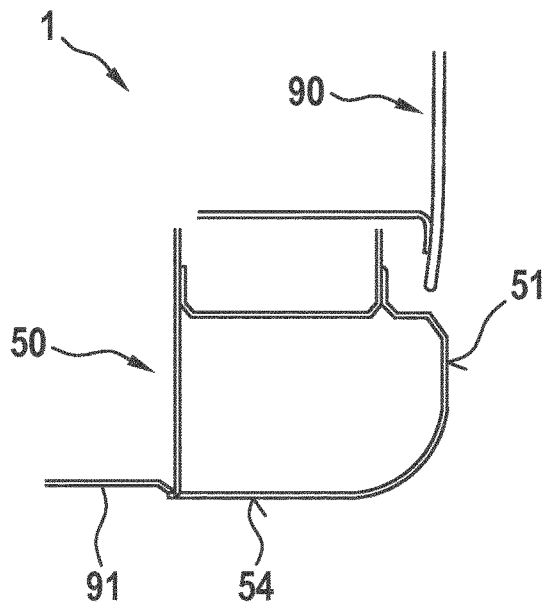
FIGS. 3-5 show in a sectioned view from the front an arrangement from an outer sill and a covering in a dismounted and in a mounted state.

FIG. 3 shows in a sectioned front view, i.e. with a section in a yz-plane, a part of a vehicle 1 and the body 90 of the same with an outer sill 50, which has an outer side 51 and an underside 54. As part of the body 90, the outer sill 50 is connected to an underbody covering 91, 92 as a component of the body 90.

Figure 4:
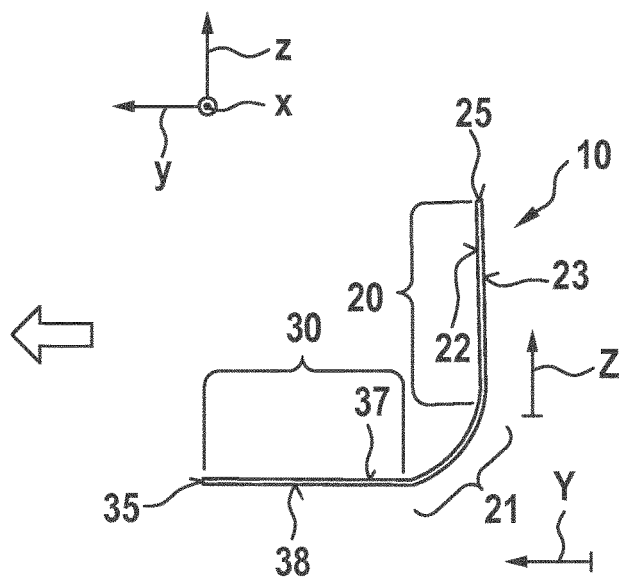

FIG. 4 shows an embodiment of the covering 10 for an outer sill 50 according to the invention, namely likewise in a sectioned view from the front, i.e. again with a section plane that is parallel to the yz-plane. In the representation of FIG. 4, the covering 10 in this section assumes the shape of a perpendicularly mirrored letter L. The covering 10 is formed by a covering region 20 substantially in a plane that is parallel to the xz-plane and a mounting region 30 substantially in a plane that is parallel to the xy-plane. The mounting region 30 and the covering region 20 are connected to one another by a transition region or connecting region 21.

The covering region 20 has an inner side 22 and an outer side 23 as well as a top edge 25. The mounting region 30 has an inner side 37 and an outer side 38 as well as a lateral edge 35.

The FIGS. 3 and 4 show the body 90 and the outer sill 50 on the one hand and the covering 10 for the outer sill 50 in the dismounted, i.e. spatially separated state, on the other hand. The arrow pointing from the right to the left signifies the mounting step of the covering 10 to the outer sill 50.

Figure 5:
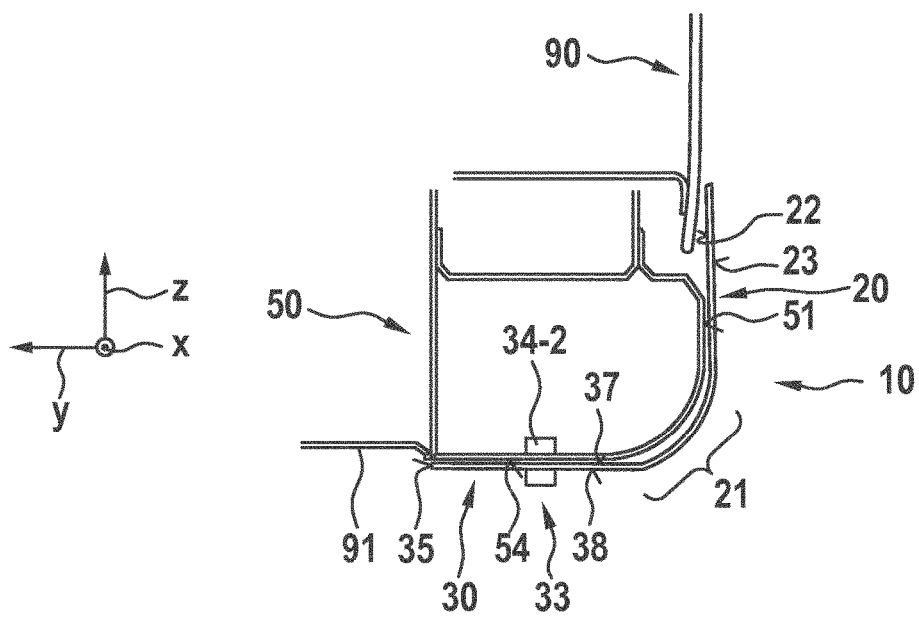

FIG. 5 shows the covering 10 in the state as mounted on the outer sill 50.

By approximating the cover 10 from the FIG. 4 to the outer sill 50 from FIG. 3 in the arrow direction, the inner side 22 of the covering region 20 faces the outer side 51 of the sill 50 and is in contact with the same where appropriate. In addition, the inner side 37 of the mounting region 30 of the covering 10 faces the underside 54 of the outer sill 50 and is in contact with the same where appropriate.

For fastening the covering 10 with the inner side 37 of the mounting region 30 facing the underside 54 of the outer sill 50, the mounting region 30 comprises a plurality of mounting elements 33. These can be formed for example of a mounting hole 34-1 combined with a mounting device 34-2, for example a bolt or a screw or the like.

In FIG. 5, only a mounting device 34-2 in the form of a bolt or screw is schematically shown in cross section, which penetrates the mounting region 30 and the underside 54 of the outer sill 50 and retainingly connects both elements with one another.

Figure 6:
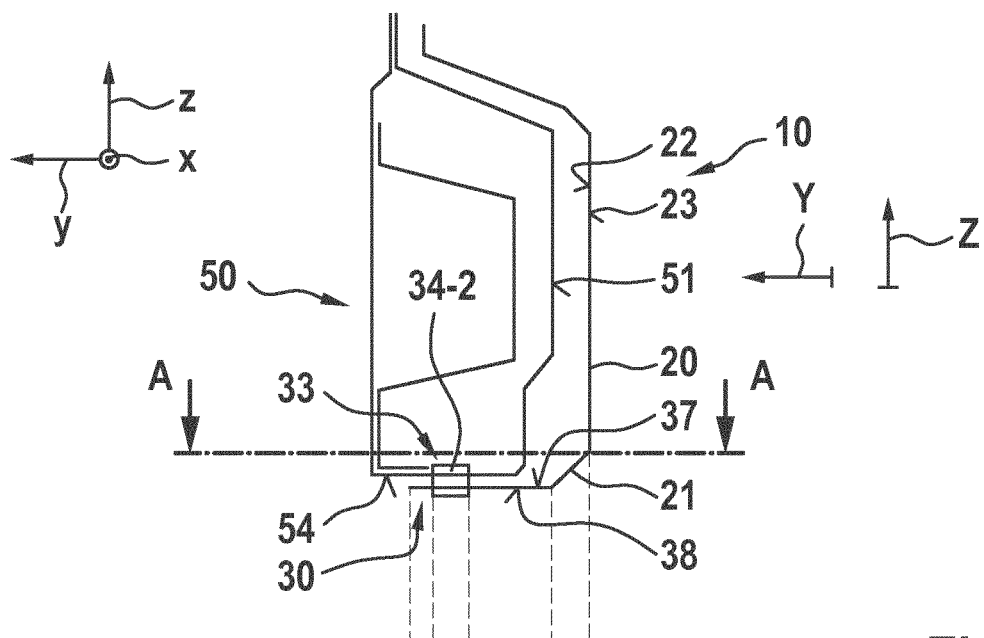
FIG. 6 shows, in a sectioned view from the front, another embodiment of a covering in the mounted state on an outer sill.

FIG. 6 shows in a sectioned view from the front, i.e. with a section plane that is parallel to the yz-plane, an embodiment of the covering 10 according to the invention in the mounted state on an outer sill 50. In the mounted state, the inner side 22 of the covering region 20 of the covering 10 in turn faces the outer side 51 of the sill 50, whereas the outer side 23 faces away from the outer side 51 of the outer sill 50.

Imparted by the transition region 21, the covering region 20 is followed by the mounting region 30 which, in the mounted state of the covering 10, is arranged so that its inner side 37 faces the underside 54 of the outer sill 50. The outer side 38 of the mounting region 30 by contrast faces away from the underside 54 of the outer sill 50. Schematically indicated is a mounting device 34-2 in the form of a screw, a bolt or a bush as part of the mounting element 33 of the mounting region 30 of the covering 10.

Figure 7:
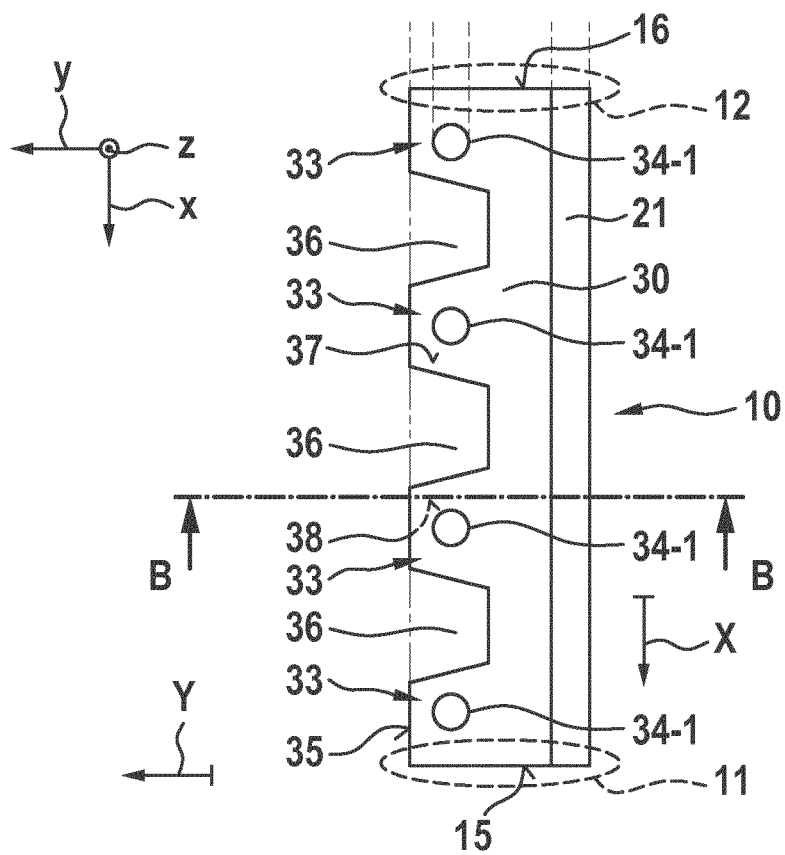
FIG. 7 shows, in a sectioned plan view, the covering according to the invention from the embodiment according to FIG. 6.

FIG. 7 shows a sectioned plan view of the covering 10 from FIG. 6 in isolated form, wherein in FIG. 6 the section plane A-A used as a base is indicated.

This representation shows that the covering 10 on the whole, and in particular the mounting region 30, extend in the x-direction as longitudinal extension direction X between the first and second ends 11 or 12. Here, the mounting region 30 comprises at the first end 11 a front edge 15 and at the second end 12 a rear edge 16 and a lateral edge 35 substantially running in the longitudinal extension direction X. However, the lateral edge 35 is not continuously linear but according to the invention has, between consecutive mounting elements 33 which comprise mounting holes 34-1, recesses 36. The recesses 36 are formed so that the lateral edge 35 of the mounting region 30 runs in the y-direction as first transverse extension direction Y set back towards the covering region 20 in sections.

In the embodiment of FIG. 7, the recesses 36 of the mounting region 30 have a trapezoidal shape, which tapers in the direction of the transition region 21 and, in particular, in the direction of the covering region 20 of the covering 10. The rear edge of the recess 36 in the direction of the transition region 21 or the covering region 20 extends behind the mounting elements 33 with the mounting holes 34-1. Recesses 36 configured differently are also contemplated, for example in rectangular, saw-tooth or wave form.

In the embodiment of FIGS. 6 and 7, between every two directly adjacent mounting elements 33 with mounting holes 34-1, a recess 36 is provided in each case. However this is not mandatory.

In FIG. 7, a section plane is indicated by B-B via which the view of FIG. 6 is defined.

In the FIGS. 8 and 8A to 8D another embodiment of the covering 10 for an outer sill 50 of a vehicle 1 according to the invention is described.

Figure 8:
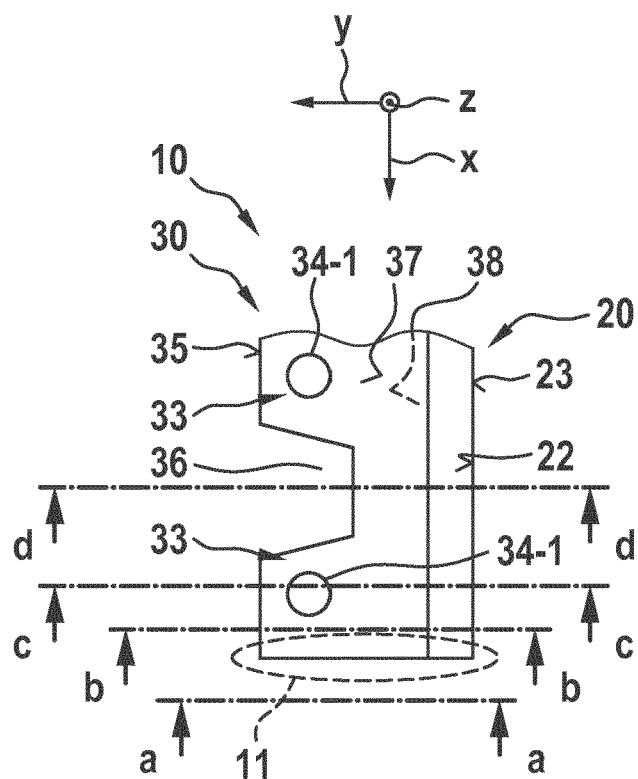
FIGS. 8, 8A-8D show, in a sectioned plan view or in views from the front, another embodiment of the covering according to the invention.
Figure 8A:
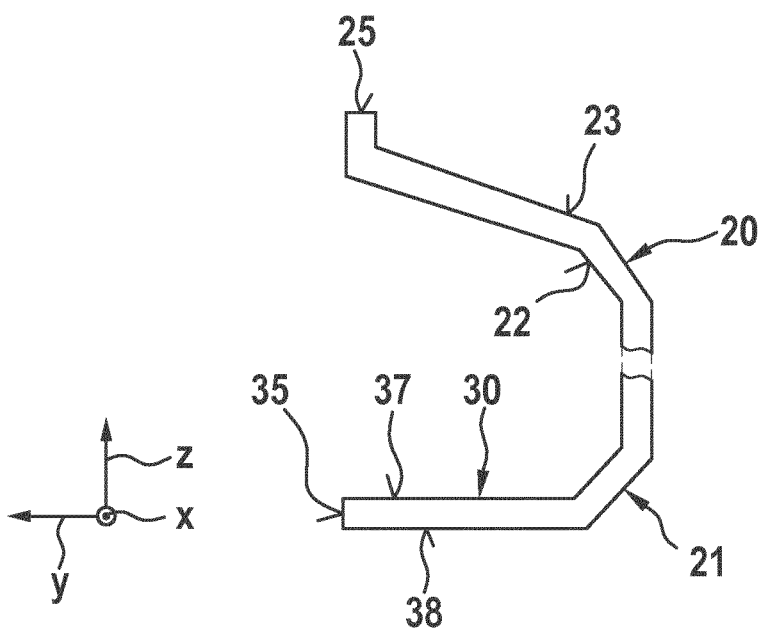
Figure 8B:
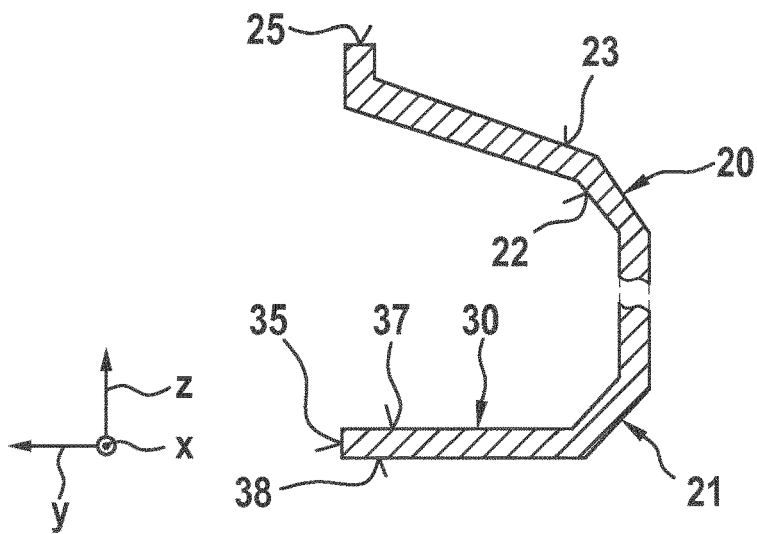
Figure 8C:
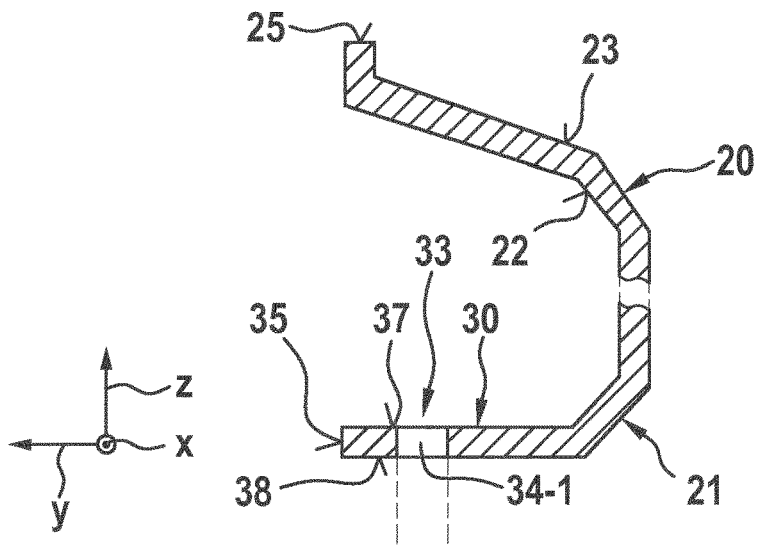
Figure 8D:
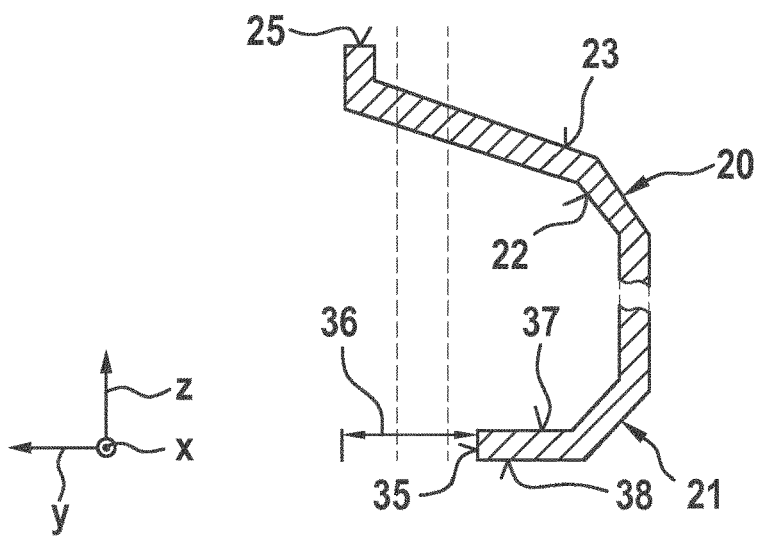

FIG. 8 shows a sectioned plan view with a plane that is parallel to the xy-plane as section plane. The plan view of FIG. 8 approximately corresponds to the plan view from FIG. 7. In FIG. 8, different section planes for the views of the FIGS. 8A to 8D are indicated by a-a, b-b, c-c and d-d.

Viewing the FIGS. 8 and 8A to 8D together shows that this embodiment of the covering 10 according to the invention is produced from one part, i.e. from a unitary material. Such an embodiment is particularly reliable, but not compulsory.

Furthermore, it is shown that the recesses 36 of the mounting region 30 of the covering 10 result in the lateral edge 35 of the mounting region 30 running in the direction of the transition region 21 or the covering region 20 set back behind the mounting elements 33 with the mounting holes 34-1.

Figure 9:
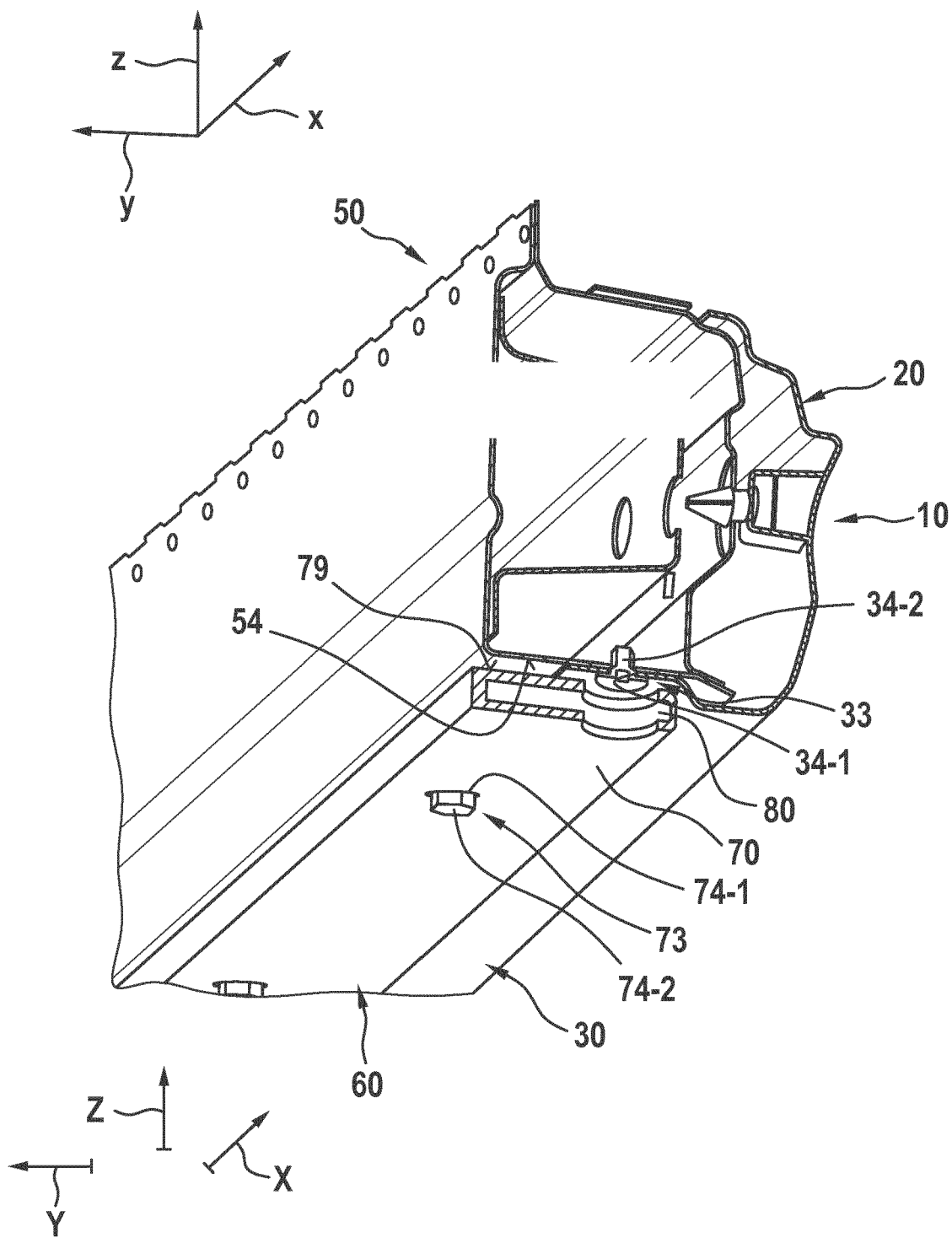
FIGS. 9-11 show, in a perspective view from below, different embodiments of the covering according to the invention in the mounted state on an outer sill of a vehicle.
Figure 10:
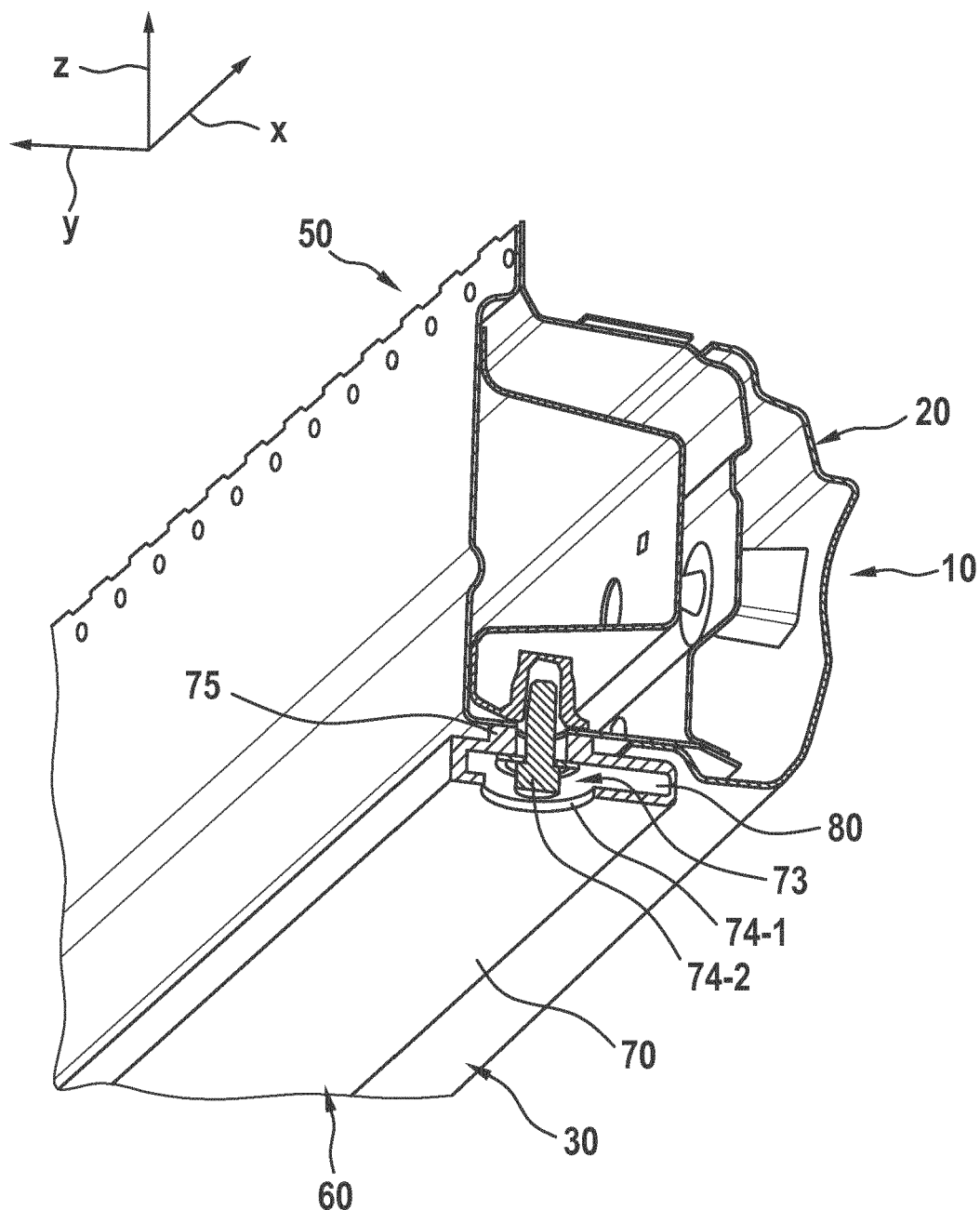
Figure 11:
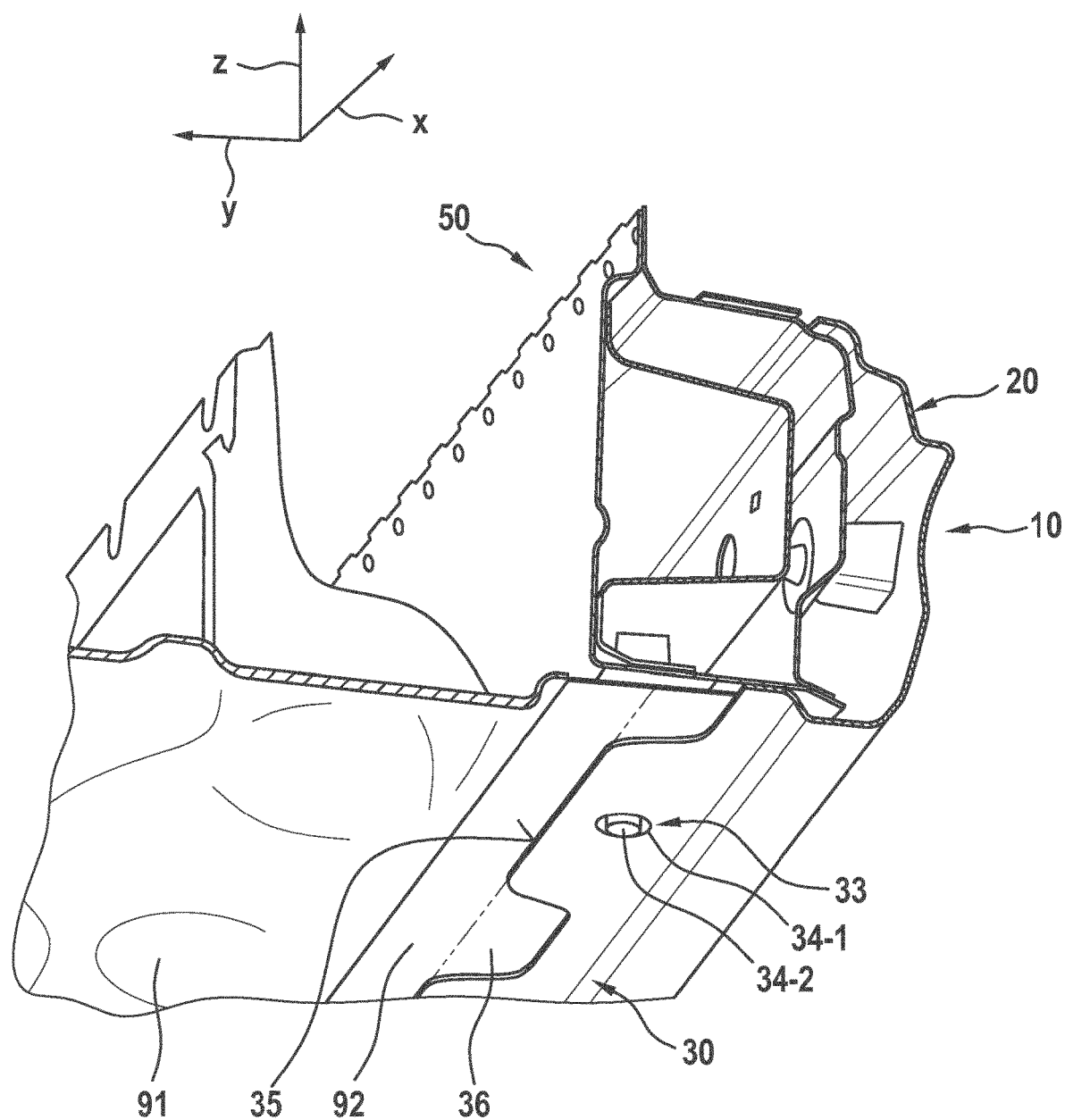

FIGS. 9 to 11 show in a perspective view from below other embodiments of the covering 10 for an outer sill 50 according to the invention combined with an energy storage element 60 according to the invention, for example in the form of a lithium ion battery arrangement. Where the energy storage element extends from one side of the vehicle to the other, a mirror symmetrical arrangement is provided but not shown.

In the embodiments shown in the FIGS. 9 and 10, the independence of the mounting of the covering 10 according to the invention and of the energy storage element 60 according to the invention becomes fully effective according to the invention.

The energy storage element 60 has the same longitudinal extension direction in the x-direction as the covering 10 with the covering region 20 and the mounting region 30. This longitudinal extension direction also corresponds to the vehicle longitudinal direction.

The energy storage element 60 has a housing region 70, in the interior of which a storage device 80 for electric energy is received. The energy storage element 60 is fastened on one lateral side to an outer sill of the vehicle as shown in the FIGS. 9 and 10 with its top side or mounting side 79 by way of fastening elements 73, which are formed, in each case by a fastening hole 74-1 and a fastener 74-2 passing through the fastening hole 74-1, for example a bolt, a bush or a screw. This means the mounting side 79 of the energy storage element 60 according to the invention faces the underside 54 of the outer sill 50 in the mounted state. A mirror symmetrical fastening of the energy storage element extending from one side of the vehicle to the other occurs at the outer sill on the other side of the vehicle.

However, the mounting side 79 of the energy storage element 60 is spaced from the underside 54 of the outer sill 50 in the mounted state of the energy storage element 60, namely in that according to FIG. 10 the fastening element 73 in each case additionally comprises a spacer element 75, for example in the form of a sleeve or a collar. Because of this, the mounting side 79 of the energy storage element 60 is not supported on the underside 54 of the outer sill 50.

This spacing also brings about a spacing of the mounting side 79 of the energy storage element 60 from the outer side 38 of the mounting region 30 of the covering 10 according to the invention. This means that the energy storage element 60 and the covering 10 are not contacted mechanically or at most only slightly so that the energy storage element 60 and the covering 10 can be mounted on or dismounted from the outer sill 50 independently of one another.

As a consequence of this the possibility of providing a single covering 10 materializes. These are then suitable on the one hand for conventional vehicles with internal combustion engine, in the case of which no energy storage elements 60 are provided. However, they are also suitable for hybrid or electric vehicles, in the case of which such energy storage elements 60 are formed. This reduces the need of having to stock different coverings 10 for different vehicle types or drive types.

From FIG. 11 it becomes clear that with dismounted energy storage element 60 the lateral edge 35 of the mounting region 30 of the covering 10 according to the invention runs set back to the transition region 21 and in particular to the covering region 20 of the covering 10 because of the provision of recesses 36.

In this representation, the underbody covering 91, 92 of the body 90 in conjunction with the outer sill 50 can also be seen. The underbody covering 91, 92 is inserted between the underside 54 of the outer sill 50 and the top side 38 of the mounting region 30 of the covering 10 in order to cover in particular the underside 54 of the outer sill 50 in the region of the recesses 36 of the mounting region 30 and thus protect it from dirt, water and mechanical damage.

According to the invention, it is especially the recesses 36 in the mounting region 30 of the covering 10 according to the invention which bring about the advantages of the invention. This becomes clearer in connection with the FIGS. 12A to 12C, 13 and 14.

These figures show an energy storage element 60 according to the invention in a partly sectioned front and plan view and, in particular, combined with an embodiment of the covering 10 according to the invention.

This embodiment of the energy storage element 60 according to the invention extends with its housing region 70 in the same longitudinal extension direction x as the embodiment of the covering 10 that is likewise represented there. The energy storage element 60 with its housing region 70 has a first or front end 71 and a second or rear end 72 with a front edge 76 or with a rear edge 77. The top side of the housing region 70 serves as mounting side 79 for fastening the energy storage element 60 to the underside 54 of the outer sill 50. While the figures schematically depict the energy storage element 60 as having an inner lateral side in the y-direction (transverse direction of the vehicle), it is understood that the energy storage element 60 extends from one side of the vehicle to the other such that the energy stores are arranged below the vehicle body, wherein the housing region of the energy storage element has a mounting side fastenable to an underside at both outer sills.

In its interior, the housing region 70 comprises a storage unit 80 for electric energy, which is only schematically indicated in the FIGS. 12A to 12C. The views of the FIGS. 12A to 12C materialize from the section planes a-a, b-b as well as c-c indicated in the FIG. 13. Again, while the figures schematically depict the housing region having a limited transverse dimension, the housing region extends from one side of the vehicle to the other, in which case a mounting side is provided at each side for the corresponding outer sill.

The housing region 70 has a plurality of fastening elements 73 each with a fastening hole 74-1 at certain distances. Suitable fasteners 74-2, for example in the form of screws or bolts, can be inserted through the fastening holes 74-1 for the mounting. According to FIGS. 9 and 10, the mounting side 79 is made to face the outer side 38 of the mounting region 30 of the covering 10 during the mounting.

FIG. 13 shows the embodiment of the energy storage element 60 according to the invention and the embodiment of the covering 10 according to the invention in a form separated from one another, wherein the front edges 15, 76 and the rear edges 16, 77 are each arranged flush. This representation shows that the fastening elements 73 are orientated with the fastening holes 74-1 in the x-direction to the recesses 36 of the mounting region 30 of the covering 10.

By joining the energy storage element 60 and the covering 10 according to FIG. 14, the fastening holes 74-1 of the fastening elements 73 of the housing region 70 of the energy storage element 60 are also orientated in relation to the y-direction. At the other side of the vehicle, a similar fastening is carried out for the other side of the energy storage element.

From the view from below according to FIG. 14, it is evident that the fastening holes 74-1 come to lie directly in the gaps of the recesses 36 of the mounting region 30. By way of the spacer elements 75 shown in the FIGS. 12A to 12C and 13 it is achieved that during mounting on an underside 54 of an outer sill 50 only a slight or no mechanical contact of the energy storage element 60 and the covering 10 in the mounted state on the outer sill 50 occurs, and so these elements can be mounted and dismounted independently of one another.

Figure 15:
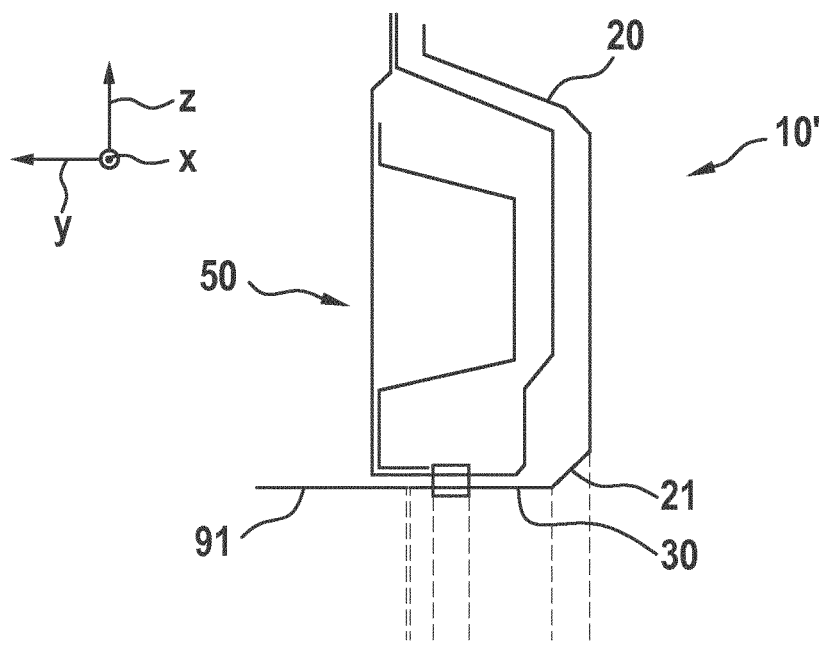
FIGS. 15, 16 show, in a sectioned view from the front or in a sectioned plan view, a covering for an outer sill in conventional form.
Figure 16:
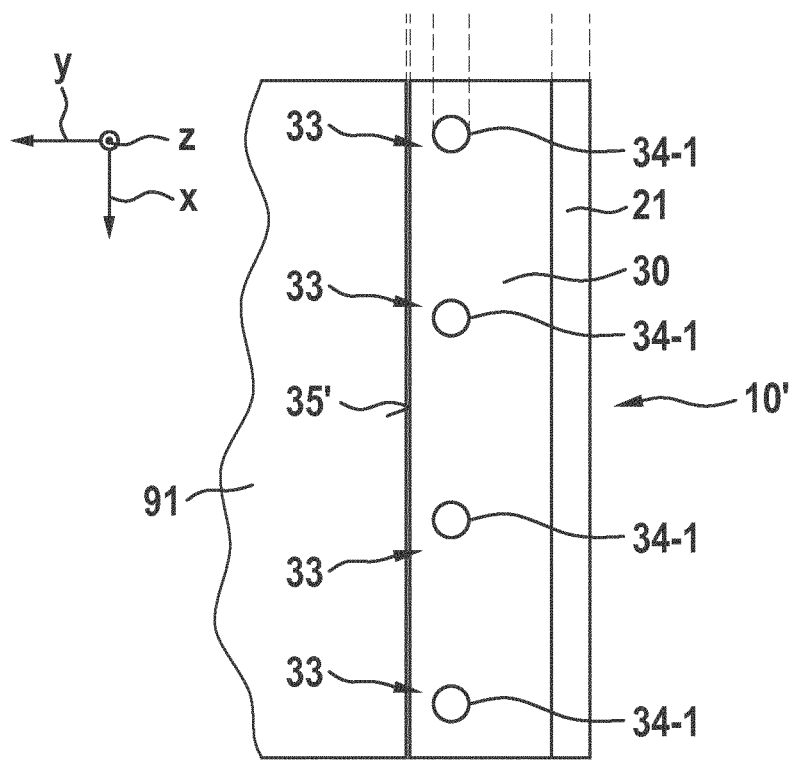

The FIGS. 15 and 16 show a conventional covering 10', which was used as a base in the development of the present invention.

In FIG. 15, the conventional covering 10' is mounted on an underside 54 of the outer sill 50 by way of suitable mounting elements 33. In contrast with the present invention, the lateral edge 35' of the conventional covering 10 runs strictly linearly between directly adjacent mounting elements 33 of the mounting region 30 and without the provision of recesses 36.

Thus, if this conventional covering 10' were to be used together with an energy storage element 60, such as is shown for example in the FIGS. 9, 10 and 12A to 12C and 13, a direct contact between the energy storage element 60 and the mounting side 79 of the same with the outer side 38 of the mounting region 30 of the conventional covering 10' would materialize, such that an already mounted conventional covering 10' could only be dismounted if the energy storage element 60 were to be dismounted beforehand. According to the invention, this additional mounting/dismounting expenditure is advantageously avoided.

This and further aspects and advantages of the present invention are explained further with the following relationships.

In the development of the present invention it was assumed on the one hand that with outer sills 50 and sill systems on the whole the sill 50 is possibly assembled and mounted in the manufacturing plant for example by welding. Here, sill coverings are also known which can be mounted on in different embodiments during the mounting.

It is assumed, furthermore, that with the integration of energy storage elements and in particular of high-voltage storage elements for hybrid or electric vehicles, the storage elements are arranged separated and spatially offset laterally from a sill covering so that the storage elements and the sill covering are arranged next to one another.

With this conventional approach, additional versions for the sill covering would be necessary, namely for vehicles exclusively with internal combustion engines and for vehicles which are alternatively or additionally operated electrically and therefore require suitable energy storage elements. This means that conventionally additional body versions with correspondingly higher costs would be necessary. In addition, a widened body connection in the region of the sill would materialize by the arranging of sill covering and energy storage elements next to one another.

As further disadvantages in the combination with conventional measures, there is at the same time a higher weight with loss of installation space. This can also have a disadvantageous effect with regard to the possible range of the vehicle.

An approach of the present invention is thus that there is no uniform interface between body and the attachment parts.

When an energy storage element is connected by way of screw-on tabs, merely a poor connection of the energy storage element materializes. Tearing-off of the tabs in an accident scenario is probable with certain types of vehicle.

LIST OF REFERENCE CHARACTERS

1 Vehicle
10 Covering
10' Conventional covering
11 First end
12 Second end
15 Front edge
16 Rear edge
20 Covering region
21 Transition region
22 Inner side
23 Outer side
25 Top edge
30 Mounting region
31 First end
32 Second end
33 Mounting element
34-1 Mounting hole
34-2 Mounting device
35 Lateral edge
35' Conventional lateral edge
36 Recess
50 Outer sill
54 Underside
60 Energy storage element, high-voltage storage element
70 Housing region
71 First end
72 Second end
73 Fastening element
74-1 Fastening hole
74-2 Fastener
75 Spacer element
76 Front edge
77 Rear edge
79 Mounting side
80 Storage unit, energy store
90 Body
91 Underbody covering
92 Underbody covering
x Space direction
X Longitudinal extension direction
Space direction
Y
Y First transverse extension direction
z Space direction
Z Second transverse extension direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a body which comprises an outer sill; and
   a covering for the outer sill, the covering comprising:
   a covering region and a mounting region, which extend between first and second ends of the covering along a longitudinal extension direction, wherein
   the mounting region extends in a first transverse extension direction perpendicularly to the longitudinal extension direction and comprises mounting elements so as to be mountable for a mounted state to an underside of the outer sill, and
   facing away from the covering region in the longitudinal extension direction, the mounting region comprises a lateral edge which, between mounting elements, comprises recesses which are formed so that sections of the lateral edge of the mounting region extend in a recessed manner in the first transverse extension direction towards the covering region in sections,
   wherein the covering is fastened by way of the mounting elements of the mounting region to an underside of the outer sill,
   wherein the vehicle is an electric or hybrid motor vehicle having an energy storage element, and
   the energy storage element is mounted with a mounting side of a housing region of the energy storage element facing an underside of the outer sill of the electric or hybrid motor vehicle such that a respective fastening element of the energy storage element is arranged in a region of a recess of the mounting region of the covering of the outer sill.

2. The vehicle as claimed in claim 1, wherein
   the body comprises left and right side outer sills, and
   the energy storage element extends below the vehicle body and is mounted at each side.

3. The vehicle as claimed in claim 1, wherein
   the recesses of the lateral edge are formed so that the lateral edge of the mounting region in the first transverse extension direction runs set back behind the mounting elements in sections.

4. The vehicle as claimed in claim 3, wherein the lateral edge of the mounting region comprises a recess between every two mounting elements that are adjacent following one another.

5. The vehicle as claimed in claim 1, wherein the lateral edge of the mounting region comprises a recess between every two mounting elements that are adjacent following one another.

6. The vehicle as claimed in claim 1, wherein the covering region extends in a second transverse extension direction perpendicularly to the longitudinal extension direction in order to cover, in a mounted state, an outer side of the outer sill along the longitudinal extension direction and the second transverse extension direction outside and laterally on the vehicle.

7. The vehicle as claimed in claim 6, wherein the covering region and the mounting region are connected to one another in the longitudinal extension direction.

8. The vehicle as claimed in claim 7, wherein the covering region and the mounting region comprise a unitary material.

9. The vehicle as claimed in claim 1, wherein a respective mounting element is a mounting hole which is formed for receiving a mounting device.

10. The vehicle according to claim 1, wherein an energy storage unit is formed in an interior of the housing region, wherein the housing region extends along a longitudinal extension direction, and the housing region comprises the at least one fastening element so as to be fastenable, for a mounted state, with the mounting side of the housing region facing the underside of the outer sill of the vehicle.

11. The vehicle as claimed in claim 10, wherein the at least one fastening element is formed as a fastening hole in or through the housing region, which extends in a transverse extension direction perpendicularly to the longitudinal extension direction and which is formed for receiving a fastener.

12. The vehicle as claimed in claim 11, wherein on the mounting side of the housing region in the region of the at least one fastening element, at least one spacer element is formed, which extends in the transverse extension direction and in the mounted state creates a spatial distance between the mounting side of the housing region and the underside of the vehicle.

13. The vehicle as claimed in claim 1, wherein the energy storage element is a high-voltage storage element.

14. The vehicle as claimed in claim 1, wherein the respective fastening element is arranged together with a spacer element in the region of the recess of the mounting region of the covering of the outer sill.

* * * * *